(12) United States Patent
Kacmarcik et al.

(10) Patent No.: US 10,404,769 B2
(45) Date of Patent: Sep. 3, 2019

(54) REMOTE DESKTOP VIDEO STREAMING ALPHA-CHANNEL

(71) Applicant: Google LLC, Mountain View, CA (US)

(72) Inventors: Gary Kacmarcik, Bothell, WA (US); James Weatherall, Kirkland, WA (US); Stephen John Konig, Newcastle, WA (US); Alex Pakhunov, Kirkland, WA (US); Sergey Yurevich Ulanov, Bellevue, WA (US)

(73) Assignee: Google LLC, Mountain View, CA (US)

( * ) Notice: Subject to any disclaimer, the term of this patent is extended or adjusted under 35 U.S.C. 154(b) by 760 days.

(21) Appl. No.: 14/145,236

(22) Filed: Dec. 31, 2013

(65) Prior Publication Data

US 2015/0188973 A1 Jul. 2, 2015

(51) Int. Cl.
*H04L 29/06* (2006.01)
(52) U.S. Cl.
CPC ............ *H04L 65/607* (2013.01); *H04L 67/38* (2013.01)
(58) Field of Classification Search
None
See application file for complete search history.

(56) References Cited

U.S. PATENT DOCUMENTS

| 6,047,312 A | 4/2000 | Brooks et al. |
| 7,409,405 B1 | 8/2008 | Masinter et al. |
| 8,014,615 B2 | 9/2011 | Uro |

| 2009/0204711 A1* | 8/2009 | Binyamin | H04L 67/16 709/226 |
| 2009/0328033 A1* | 12/2009 | Kohavi | G06F 9/5027 718/1 |
| 2010/0079480 A1* | 4/2010 | Murtagh | G06T 11/60 345/592 |
| 2010/0253697 A1* | 10/2010 | Rivera | G06T 15/503 345/589 |

(Continued)

FOREIGN PATENT DOCUMENTS

WO 2015103249 A2 7/2015

OTHER PUBLICATIONS

CertifiedCIO (Windows Server 2012 RemoteApp on Windows 7 Walk-through, Youtube video, https://www.youtube.com/watch?v=vNSiQnRmo3Y, published on Feb. 10, 2013) Screen capture in PDF file.*

(Continued)

*Primary Examiner* — Yu Chen
(74) *Attorney, Agent, or Firm* — Byrne Poh LLP

(57) ABSTRACT

A method includes preparing images of a remote desktop including an open cloud-application window object corresponding to an instance of a network-hosted application executing on a network, encoding the images of the remote desktop as image frames in a video stream, and transmitting the video stream over the network to a computing device. The images the remote desktop are encoded such that when decoded, reconstructed, and displayed on a local desktop of the computing device, the open cloud-application window object corresponding to the instance of the network-hosted application executing on the network has the appearance and behavior of an open window corresponding to a natively-operating application on the local desktop of the computing device.

23 Claims, 5 Drawing Sheets

(56) References Cited

U.S. PATENT DOCUMENTS

| | | | |
|---|---|---|---|
| 2011/0246904 A1* | 10/2011 | Pinto | G06F 9/4445 |
| | | | 715/740 |
| 2012/0226742 A1* | 9/2012 | Momchilov | G06F 3/0481 |
| | | | 709/203 |
| 2013/0016966 A1 | 1/2013 | Jansen et al. | |
| 2013/0130683 A1 | 5/2013 | Krukar | |
| 2015/0121243 A1* | 4/2015 | Schmieder | H04L 67/025 |
| | | | 715/740 |
| 2015/0188990 A1 | 7/2015 | Kacmarcik et al. | |

OTHER PUBLICATIONS

Invitation to Pay Additional Fees and Partial Search Report received for PCT Patent Application No. PCT/US2014/072728, dated Apr. 29, 2015, 6 pages.

International Search Report and Written Opinion received for PCT Patent Application No. PCT/US2014/072728, dated Jul. 7, 2015, 15 pages.

Williams, "Amazon Launches WorkSpaces, A Virtual Desktop Service on AWS", http://techcrunch.com/2013/11/13/amazon-launches-workspaces-a-virtual-desktop-service-on-aws/, Nov. 13, 2013, 4 pages.

"Amazon WorkSpaces", retrieved on Nov. 13, 2013, from http://aws.amazon.com/workspaces/, 3 pages.

"Amazon WorkSpaces Product Details", retrieved on Nov. 13, 2013, from http://aws.amazon.com/workspaces/details, 5 pages.

"Alpha Channel", retrieved on Jul. 16, 2012 from http://wiki.webmproject.org/alpha-channel, 5 pages.

"Alpha compositing", Wikipedia, the free encyclopedia, retrieved on Jul. 16, 2013 from http://en.wikipedia.org/wiki/Alpha_compositing, 6 pages.

"Citrix Streamlines Delivery of Cloud-Hosted Apps and Desktops", Citrix Systems, Inc., Mar. 19, 2012, 2 pages.

"RGBA color space", Wikipedia, the free encyclopedia, retrieved on Jul. 16, 2013 from http://en.wikipedia.org/wiki/RGBA_color_space, 3 pages.

* cited by examiner

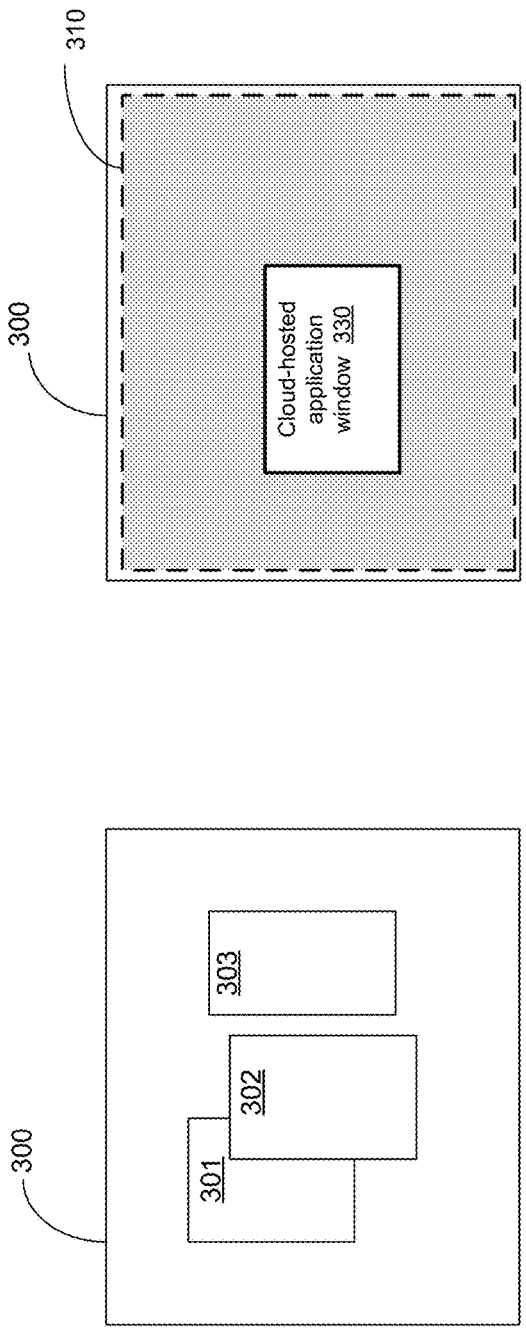
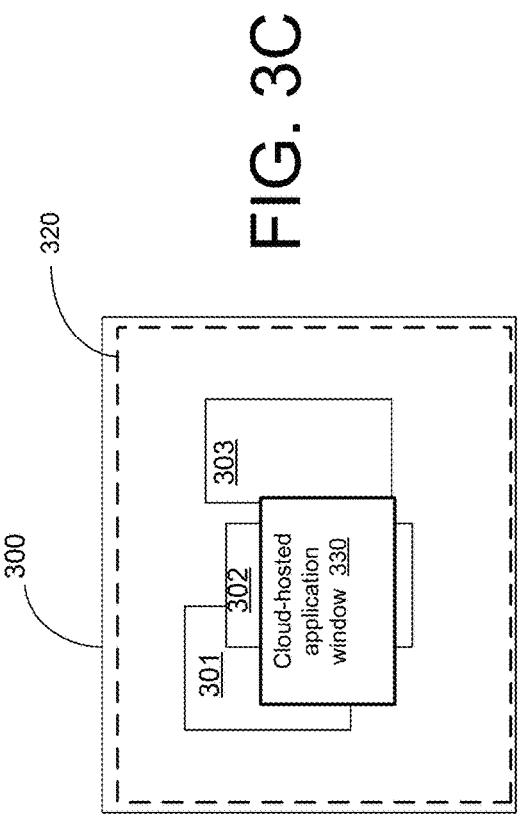
FIG. 3A
FIG. 3B
FIG. 3C

REMOTE DESKTOP VIDEO STREAMING ALPHA-CHANNEL

BACKGROUND

A local personal computing device may concurrently run one or more instances of programs or applications (e.g., natively-operating applications). Thus, the local personal computing device may have multiple open program or application windows displayed on its graphical user interface. The multiple open program or application windows may be displayed in different geometrical arrangements (e.g., a cascade arrangement—which puts windows in a single stack that has been fanned out; a stacked arrangement—which puts windows in one or more vertical stacks; or a side by side arrangement—which places each window open, but not maximized, on display). When multiple windows are open on the graphical user interface of the computing device, a user may navigate to, activate or operate a specific program or application window using navigational aids (e.g., tabs, taskbar buttons, etc.).

Consideration is now being given to the display, on a personal computing device, of an open program window of a cloud-based or network-based application running in the cloud.

SUMMARY

This disclosure generally relates to cloud computing arrangements and services.

In a general aspect, a method includes receiving, on a computing device, images of a remote desktop encoded as image frames in a video stream of. The remote desktop has an open cloud-application window object corresponding to an instance of a network-hosted application executing on the network. The method further includes decoding the image frames in the video stream to reconstruct the images of the remote desktop and displaying the reconstructed images of the remote desktop on a local desktop of the computing device so that at least a portion of the local desktop is visible and user-accessible through a transparent portion of the remote desktop. The open cloud-application window object corresponding to the instance of the network-hosted application executing on the network is displayed as an object on the local desktop having an appearance and behavior of an open window corresponding to a natively-operating application on the local desktop.

In a general aspect, a system includes at least one server having at least one processor, at least one memory, and at least one video encoder. The server is hosted on a network having a communicative links for establishing a connection to a computing device. The system further includes a cloud computing service module coupled to the at least one video encoder. The cloud computing service module is configured to prepare images of a remote desktop including an open cloud-application window object corresponding to an instance of a network-hosted application executing on the network. The images of the remote desktop have a "full size" conforming to a size of a local desktop of the computing device. The cloud computing service module encodes the images of the remote desktop as image frames in a video stream signal and adds a transparency channel carrying values of a transparency attribute of the images to the video stream.

In a general aspect, a method includes preparing images of a remote desktop with an open cloud-application window object corresponding to an instance of a network-hosted application executing on a network. The method further includes encoding the images of the remote desktop as image frames in a video stream, and transmitting the video stream over the network to a computing device. The images the remote desktop in the video stream are encoded such that when the images are decoded, reconstructed, and displayed on a local desktop of the computing device, the open cloud-application window object corresponding to the instance of the network-hosted application executing on the network has an appearance and behavior of an open window corresponding to a natively-operating application on the local desktop.

BRIEF DESCRIPTION OF THE DRAWINGS

FIGS. 3A-3C are schematic illustrations of an example local desktop of a client computing device and example cloud-hosted remote desktops overlaid on the local desktop in different scenarios, in accordance with the principles of the disclosure herein.

Like reference symbols in the various drawings indicate like elements.

DETAILED DESCRIPTION

Figure 1:
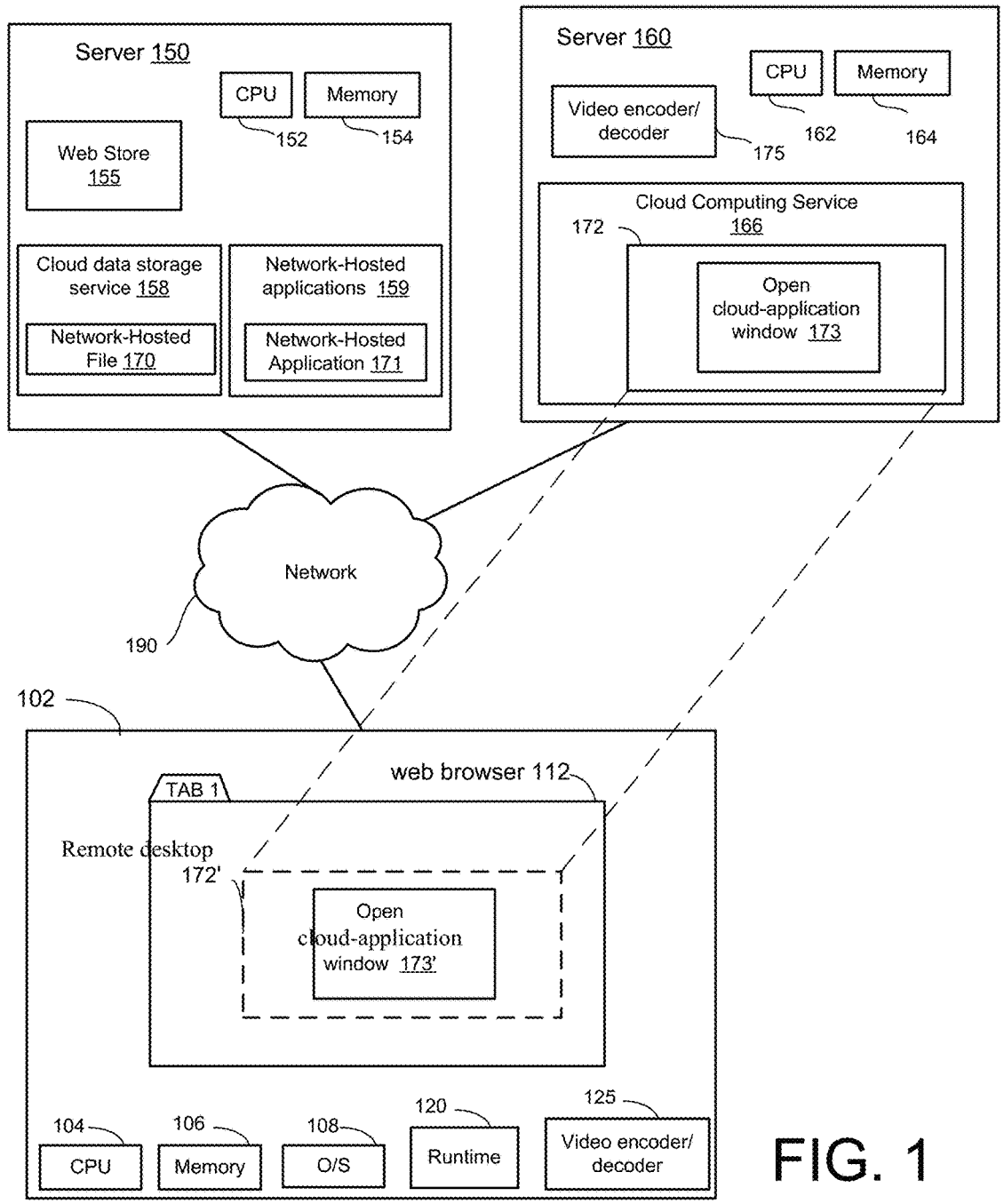
FIG. 1 is a schematic block diagram illustration of an example computer system that may be used to implement a cloud computing service for a personal computing device, in accordance with the principles of the present disclosure.

Despite the ubiquitousness of personal computing devices (e.g., smartphone, laptop, tablet or notebook computer, etc.), users may still have to use or rely on natively-operating applications running in a high power desktop computer or server environment for certain computing needs (e.g., computer-aided design, image processing, numerical simulations, etc.) that require processor-intensive or data-intensive computing applications (e.g., computer-aided-design, image processing applications, numerical simulators, etc.).

Under a cloud computing paradigm, a personal computing device (e.g., smartphone, laptop, tablet or notebook computer) may be configured with computing capabilities via a cloud-based or network-based service (hereinafter "cloud-computing service"). Computing programs or applications (e.g., computer-aided-design programs, image processing applications, numerical simulators, etc.) required for the service may be hosted and executed on one or more remote servers that are located in the cloud. The data, documents or files processed or operated on by cloud-based or network-based applications also may be stored in the cloud (e.g., in a user's cloud storage account with a public, private, or community cloud storage service).

A personal computing device may be configured or integrated with a cloud-based or network-based computing service (hereinafter "cloud computing service") that allows the personal computing device to process network-based user data, documents or files using a cloud-based or network-based application running in the cloud. The cloud computing service may be configured to transmit a cloud-hosted or remote desktop as a video stream to the personal computing device for display on a graphical user interface (e.g., a local desktop) of the personal computing device. The remote desktop may include an open application window object (hereinafter "cloud-application" window) corresponding to the cloud-based or network-based application instance executing in the cloud. A user of the local personal computing device may initiate, monitor or interact with the instance of the cloud-based or network-based application executing in the cloud via the displayed remote desktop/open cloud-application window.

Consideration is now being given to the display, on a personal computing device, of an open application window of a cloud-based or network-based application running in the cloud. Attention is directed to making user experience of a cloud-based or network-based application appear to be the same as that of using a natively-operating application on the personal computing device.

In accordance with the principles of the present disclosure, the cloud computing service may be configured to "video shape" images of the remote desktop/open cloud-application window that are video streamed to and displayed on the graphical user interface or local desktop of the personal computing device. Video shaping of the images may involve modifying a transparency attribute of the images in a desired spatial pattern or shape and may be accomplished by including a separate transparency or alpha channel in the video stream to carry transparency or alpha values for individual pixels in the images. Video shaping of the remote desktop/open cloud-application window may allow integration of the cloud-hosted application on the local desktop of the personal computing device. An example video-shaped remote desktop/open cloud-application window may have an appearance and interactive use properties or behaviors, which may be the same or similar to the appearance and the interactive use properties or behaviors of an open natively-operating application window on the local desktop of the personal computing device. The interactive use properties or behaviors may, for example, include responses to user-input actions (e.g. keyboard entries, mouse clicks, drag and drop actions, etc.).

For convenience in description, the term "image" may be used interchangeably herein to refer to image data or to a physical depiction (or rendering) of an image, as may be appropriate in context. Further, for convenience in description, the terms "cloud," "cloud-based," "network," and "network-based" may be used interchangeably herein. Data in whatever form (e.g., tables, textual data, numerical data, web pages, image data, files, etc.) processed or consumed by an application may be referred to herein as a "document" or "file." Processing of data by an application may be referred to herein as "opening a document" or "opening a file" by the application.

It will be understood that the data, documents, or files that are the subject of the present disclosure may include data, documents, or files of any of a variety of format types (e.g., archive and compressed files, physical recordable media archiving files, computer-aided design (CAD) files, electronic design automation (EDA) files, test technology files, database files, desktop publishing files, formatted and plain text documents, font files, geographic information system files, graphical information organizer files, graphics files, color palettes, raster graphics files, vector graphics files, 3D graphics files, mathematical files, scientific data (data exchange) files, etc.).

An example cloud computing service (which may also be referred to as a cloud computing environment) may be configured to prepare images of a remote desktop including an open cloud-application window object corresponding to an instance of a network-hosted application executing on the network and to encode the images of the remote desktop as image frames in a video stream. The cloud computing service may be configured to shape the images in the video stream so that a portion of the remote desktop, when displayed on the local desktop of the computing device, is transparent. Objects or widgets (windows, taskbars, icons, etc.) of the local desktop may not be hidden from view under the transparent portion of the remote desktop, but may remain visible and user-accessible or operable via user-input actions (e.g., keyboard entries, mouse clicks, etc.,) through the portion of the remote desktop which is transparent.

FIG. 1 is a schematic block diagram of an example system 100 that may be used to implement the cloud computing services described above for a local personal computing device 102, in accordance with the principles of the present disclosure.

In various implementations, system 100 may include one or more personal computing devices 102 (such as desktop computers, notebook computers, netbook computers, tablet computers, smart-phones, etc.) that are communicatively linked to one or more physical or virtual servers (e.g., server 150, server 160, etc.) hosted on a network 190.

A personal computing device 102 may include one or more processors (e.g., CPU 104), one or more memories 106, a video encoder/decoder 125, and an operating system (e.g., OS 108). OS 108 may, for example, be an operating system, which is designed to work primarily with web apps. Such a personal computing device, which may be referred to as a web thin client, may only provide a web browser 112, and rely on web applications (downloaded, for example, from Web store 155 on server 150) to provide general-purpose computing functionality. Computing device 102 may execute a runtime 120 and various web applications (not shown), for example, in a tab of web browser 112, which may be provided by OS 108. Computing device 102 may be configured to use a video encoder/decoder (e.g., video codec 125) to decode image frames of a video stream (e.g., received from server 160 over network 190) and display the decoded images (e.g., remote desktop 172' including open cloud-application window 173') in its graphical user interface (e.g., web browser 112 or local desktop).

As noted above, computing device 102 may be communicatively linked to one or more servers (e.g., servers 150 and 160) on network 190. Server 150 and server 160 may each include one or more CPUs and memories (e.g., CPU 152/Memory 154, and CPU 162/Memory 164, respectively). Server 150 may also host or support a web store 155, a public or private cloud data storage service 158, and one ore more network-hosted applications 159. Cloud data storage service 158 may store user data, documents and files in a cloud storage account of a user of computing device 102.

Further, server 160 may host or support a cloud computing service module 166 and a video encoder/decoder (e.g., video codec 175) coupled thereto. Cloud computing service module 166 may be configured to provide cloud computing capability to computing device 102.

Cloud computing service module 166 may be configured so that when a user of computing device 102 selects, for example, a network-hosted file or document (e.g., network-hosted file 170) from cloud data storage (e.g., cloud data storage service 158) for opening or processing, cloud computing service module 166 selects an appropriate network-hosted application (e.g., network-hosted application 171) to open or process network-hosted file 170 on server 160.

Cloud computing service module 166 may be configured to open or process the user-selected file or document (e.g., network-hosted file or document 170) with the selected network-hosted application (e.g., network-hosted application 171) on server 160, for example, in an open cloud-application window 173 in server runtime/desktop 172. It will be understood that server 160 may not include an actual physical display and desktop 172 may not be actually displayed on server 160.

Computing service module 166 may be further configured to use video codec 175 to compress or encode images of server runtime/desktop 172 (including open cloud-application window 173) as image frames in a video stream (e.g., video stream 200, FIG. 2) to be transmitted over network 190 to project a remote desktop on computing device 102. Computing device 102 may use video codec 125 to decompress or decode the image frames in the video stream. Computing device 102 may display the decoded image frames, for example, as images of remote desktop 172' (including open cloud-application window 173') on its graphical user interface. Computing device 102 may be configured so that a user may control processing of network-hosted file 170 by network-hosted application 171 in server runtime/desktop 172 via open cloud-application window 173' in the displayed remote desktop 172'. Keyboard entries, mouse clicks or other user-input device actions in open cloud-application window 173' may be used to control or interact with the instance of network-hosted application 171 executing in the cloud.

Server runtime/desktop 172 images may have a standard size, for example, 720×480 pixels (for a standard definition display) or 1920×1080 pixels (for a high definition display). The image frames in the video stream (e.g., video stream 200, FIG. 2) prepared by computing service module 166 (e.g., using video codec 175) may be compressed to a smaller but fixed size (e.g., 640×480, 640×360, 480×270, 440×330, 400×300, 320×240, 320×180, 240×180 pixels, etc.) depending, for example, on a choice of a data rate and a video resolution for the video stream. Each pixel of the image frames in the video stream prepared by computing service module 166/video codec 175 may, for example, include image components or channels associated with a color model (e.g., RBG, YUV, etc.) that may be adopted for server runtime/desktop 172 images. A RBG image frame may, for example, have three color channels: red, green, and blue, associated with a standard RGB model that is used in computer graphics hardware. Further, for example, a YUV image frame may have a luminance or brightness channel (Y) and two chrominance or color channels (U) and (V), associated with a standard YUV model that is used in analog television systems.

In accordance with the principles of the disclosure herein, each pixel of the image frames in the video stream prepared by computing service module 166/video codec 175 may include a transparency or alpha channel in addition to the color channels. Thus, for example, in a 32-bit system, each pixel of the image frames may, contain four channels—three 8-bit channels for red, green, and blue (RGB) colors, respectively, and one 8-bit alpha channel. The alpha channel may carry information on the transparency or opacity of the pixel. An alpha value of zero may represents fully transparent pixel, and a value of 255 may represent a fully opaque pixel.

Figure 2A:
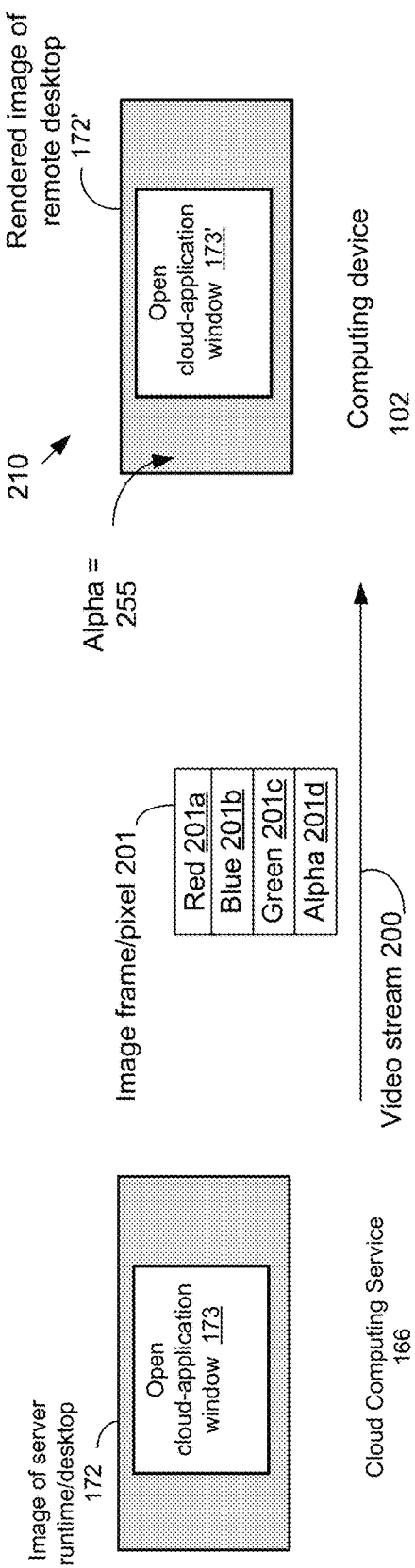
FIGS. 2A and 2B are schematic representations of a video stream transmitting an image of a server runtime/desktop from a cloud computing service to a computing device, in accordance with the principles of the present disclosure.
Figure 2B:
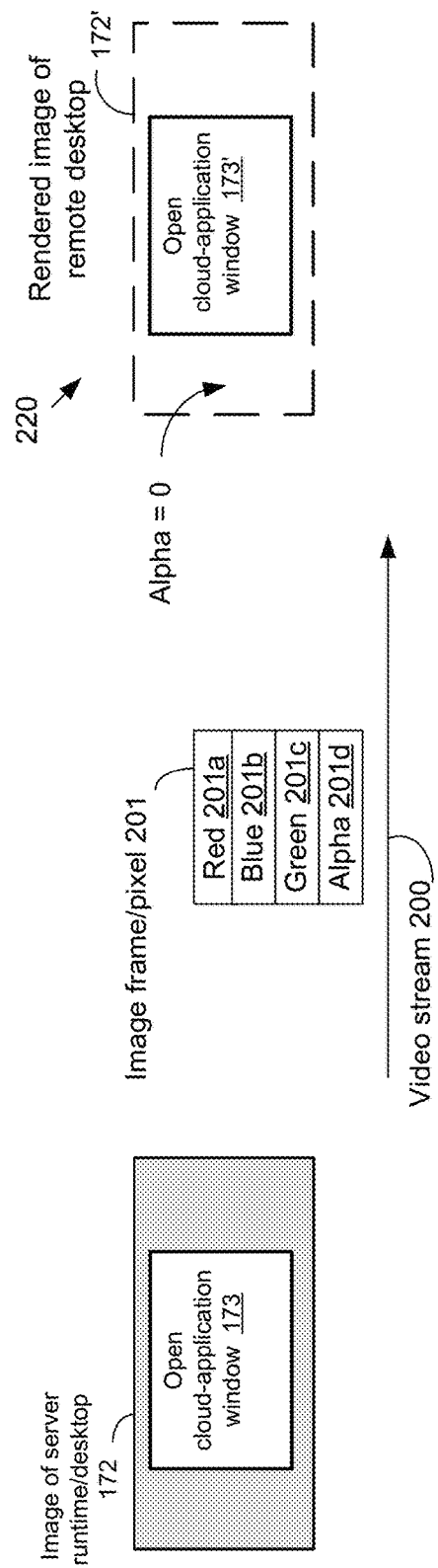

FIGS. 2A and 2B show a schematic representation of a video stream 200 transmitting an image of server runtime/desktop 172 from cloud computing service 166 to computing device 102, in accordance with the principles of the disclosure herein. As shown schematically in the figure, each image frame/pixel 201 in video stream 200 may, for example, include an alpha channel 201*d* with transparency or opacity information for the pixel in addition to red, green and blue color channels 201*a*-201*c*.

Computing service module 166 may be configured to "shape" video stream 200 by assigning different alpha values or setting different levels of transparency for different portions of the image of server runtime/desktop 172. For example, in a first scenario 210 shown in FIG. 2A, computing service module 166 may assign full opacity (i.e. alpha=255) to a background portion of server runtime/desktop 172 image surrounding or abutting open cloud-application window 173. In a second scenario 220 shown in FIG. 2B, computing service module 166 may assign full transparency (i.e. alpha=0) to the background portion of server runtime/desktop 172 image surrounding open application window 173. FIGS. 2A and 2B show, for example, renderings of the image of server runtime/desktop 172 on computing device 102 as remote desktop 172' in two scenarios 210 and 220, respectively. In scenario 210 shown in FIG. 2A, the opaque background portion of remote desktop 172' may hide or obscure features a local desktop of computing device 102 on which remote desktop 172' is displayed. In scenario 220 shown in FIG. 2B, the transparent background portion of remote desktop 172' may reveal underlying features, objects or widgets of the local desktop of computing device 102 on which remote desktop 172' is displayed.

FIGS. 3A-3C show examples of a local desktop of a client computing device and examples of cloud-hosted remote desktops in different scenarios. In particular, FIG. 3C (with reference to FIGS. 3A and 3B) pictorially exemplifies integration of a network-hosted application (e.g., network-hosted application 170) on local desktop 300 of the client computing device, in accordance with the principles of the present invention. The network-hosted application may be integrated on local desktop 300 in a manner which, for example, can provide a user a same or similar experience operating the network-hosted application as operating any natively-operating application on local desktop 300 of the client computing device.

FIG. 3A schematically shows local desktop 300 having one or more open application windows (e.g. windows 301-303), which may, for example, correspond to instances of natively-operating applications running on the client computing device. FIGS. 3B and 3C show example cloud-hosted remote desktops 310 and 320, respectively, overlaid on local desktop 300. Remote desktops 310 and 320 may both include an open cloud-hosted application window 330 corresponding to an instance of the network-hosted application (e.g., network-hosted application 170) running in the cloud. Images of remote desktops 310 and 320 may be transmitted to the client computing device in a video stream prepared, for example, by cloud computing service module 166 for display on local desktop 300.

In the example shown in FIG. 3B, only open cloud-hosted application window 330 is visible on remote desktop 310 disposed on local desktop 300. All portions of remote desktop 310 including open cloud-hosted application window 330 may be non-transparent or opaque (either because there is no alpha channel in the video stream prepared by cloud computing service module 166 or the alpha channel is set at non-transparent values). Opaque remote desktop 310 may hide or obscure objects or widgets on local desktop 300. For example, windows 301-303 (corresponding to instances of natively-operating applications running on the client computing device) seen in FIG. 3A are hidden and not visible through opaque remote desktop 310 in FIG. 3B. Thus, in the remote desktop example shown in FIG. 3B, a user may not be able to see or interact with local desktop 300 including windows 301-303 without closing or minimizing remote desktop 310, which includes open cloud-hosted application window 330.

In the example shown in FIG. 3C, which exemplifies integration of the network-hosted application on local desktop 300, open cloud-hosted application window 330 may be the only visible object of remote desktop 320, which is overlaid on local desktop 310. In contrast to remote desktop 310 (FIG. 3B), background portions of remote desktop 320 surrounding or abutting open cloud-hosted application window 330 may be transparent, for example, because of video shaping by cloud computing service module 166. For video shaping remote desktop 320, cloud computing service module 166 may, for example, have set alpha channel values for the background portions to values (alpha=0) that render the background portions transparent.

The background portions of remote desktop 320 may not only be transparent visually but may also be transparent to user-input actions (e.g., keyboard entries, mouse clicks, etc.) when remote desktop 320 is overlaid on local desktop 300. Objects or widgets on local desktop 300 may remain visible and user-accessible or operable via user-input actions (e.g., keyboard entries, mouse clicks, etc.) through the transparent background portions of remote desktop 320. For example, windows 301-303 (corresponding to instances of natively-operating applications running on the client computing device) seen in FIG. 3A are at least partially visible in FIG. 3B through the transparent background portions of remote desktop 320 surrounding or abutting open cloud-application window 330. Open cloud-hosted application window 330 (corresponding to the network-hosted application being integrated on local desktop 300) may have the same or similar appearance and interactive use properties or behaviors on local desktop 300 as that of any other local application window (e.g., windows 301-302) on local desktop 300. A user's experience of the network-hosted application on local desktop 300 may be the same as that of any natively-operating application because of the same or similar appearance and interactive use properties or behaviors of the respective application windows. A user may, for example, manage (e.g., sort, select, move, bring forward, send back, resize, or operate) the multiple windows including open cloud-hosted application window 330 displayed on local desktop 300 as if open cloud-hosted application window 330 were a local application window (e.g., windows 301-302).

The client computing device may include event handling algorithms or software (e.g., mouse listeners) which can determine the relative and/or absolute geometrical positions of input actions (e.g., mouse clicks) on the graphical user interface (e.g., local desktop 300/remote desktop 320) of the client computing device. The event handling algorithms or software may be configured so that input actions (e.g., keyboard entries, point and click actions, drag and drop, etc.) in local application windows (e.g., windows 301-303) are passed through to the corresponding natively-operating applications and dealt with in runtime 120 by OS 108 of computing device 102. In contrast, even though open cloud-hosted application window 330 may have a look and appearance of a local application window (e.g., windows 301-303) on local desktop 300, input actions (e.g., keyboard entries, point and click actions, drag and drop, etc.) in open cloud-hosted application window 330 may be transmitted over network 190 to the instance of the corresponding network-hosted application and dealt with by a corresponding runtime/operating system in the cloud.

With renewed reference to FIG. 1, it will be understood that the figure shows a particular distribution or arrangement of components (i.e. web store 155, public or private cloud data storage service 158, one or more network-hosted applications 159, cloud computing service module 166, etc.) hosted on two servers (e.g., servers 150 and 160) only for purposes of an example illustration of system 100. Various other implementations of system 100 may have other distributions or arrangements of the components, which may be hosted on one or more physical or virtual servers on network 190, and may involve less or more components than shown in FIG. 1.

It will be noted that the foregoing describes solutions for integrating network-hosted applications on a local desktop of a computing device using display examples of singular instances of a network-hosted application (e.g., network hosted application 170), a remote desktop (e.g., remote desktop 320), and an open cloud-application window (e.g., open cloud-application window 330) only for purposes of illustration and convenience in description. However, it will be understood that the solutions for integrating network-hosted applications on a local desktop of a computing device on the local desktop of the computing device may involve simultaneous or concurrent displays of multiple open cloud-application windows in one or more remote desktops corresponding to multiple instances of one or more network-hosted applications, in accordance with the principles of the disclosure herein.

Figure 4:
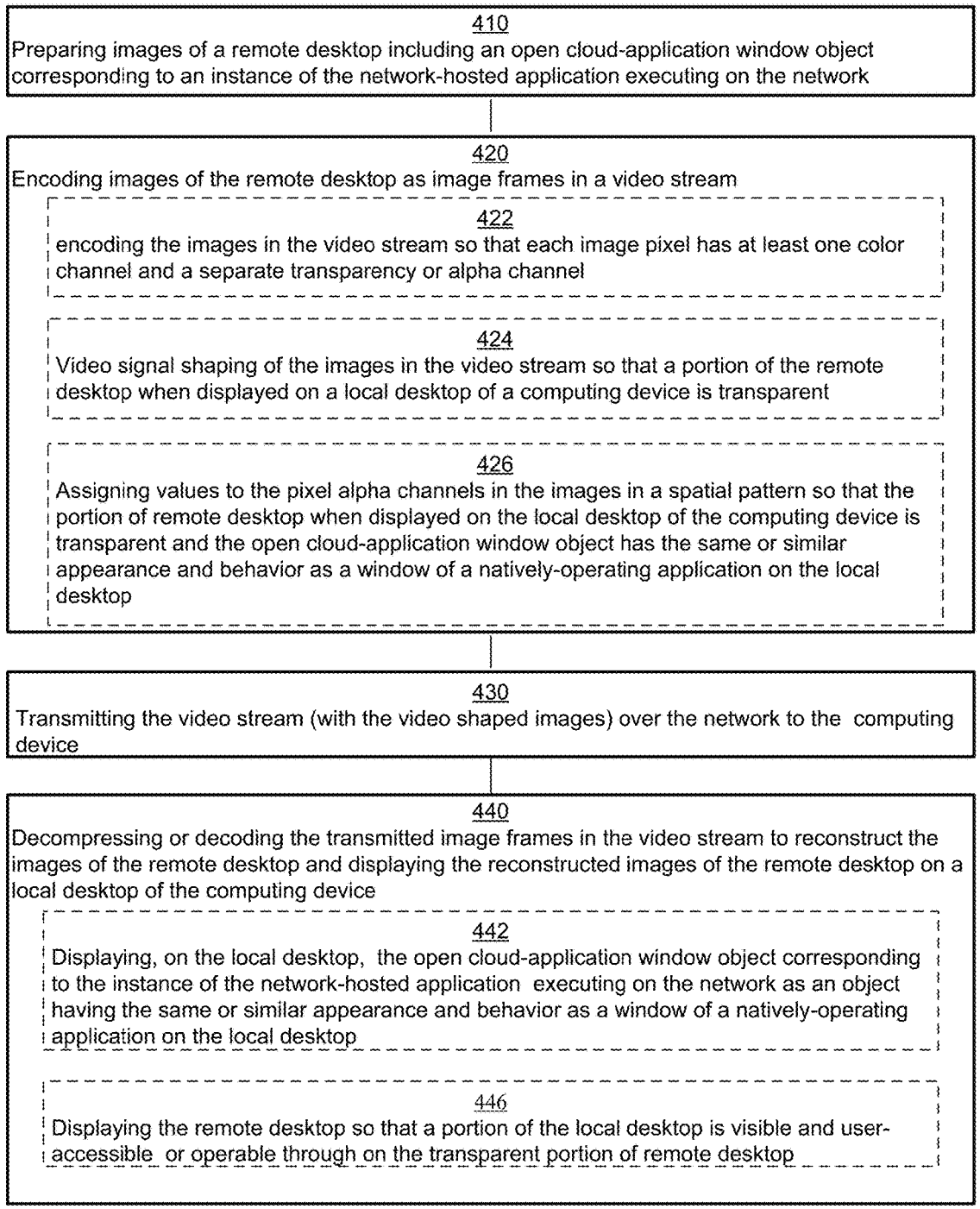
FIG. 4 is a flowchart illustration of an example method for integrating a network-hosted application on a local desktop of a personal computing device (e.g., a laptop computer, a notebook computer, a tablet computer, a smart-phone, etc.), in accordance with the principles of the disclosure herein.

FIG. 4 shows an example method 400 for integrating network-hosted applications on a local desktop of a personal computing device (e.g., a laptop computer, a notebook computer, a tablet computer, a smart-phone, etc.). The personal computing device may be configured with an operating system and may be designed to work primarily with web apps. Such a personal computing device, which may be referred to as a web thin client, may only provide a web browser, and rely on web applications to provide general-purpose computing functionality. The personal computing device may further have cloud computing capability, which involves opening or processing network-hosted files with network-hosted applications. The cloud computing capability may be provided to the personal computing device, for example, by a cloud computing service module hosted on a network server connected to the personal computing device.

Method 400 may include preparing images of a remote desktop including an open "cloud-application" window object corresponding to an instance of a network-hosted application executing on the network (410). The images of the remote desktop may have a rectangular shape and a standard size (e.g., about 720×480 pixels for a standard definition display, or about 1920×1080 pixels for a high definition display). Method 400 may further include compressing or encoding the images of the remote desktop as image frames in a video stream (420).

In method 400, encoding the images of the remote desktop as image frames in a video stream 420, may include encoding the images in the video stream so that each image pixel has at least one color channel and a separate transparency or alpha channel (422). Method 400 may include video signal shaping of the images in the video stream so that at least a portion of remote desktop when displayed on the local desktop of the computing device is transparent (424). The video signal shaping may be accomplished in method 400, for example, by assigning values (e.g., zero and non-zero) to the pixel alpha channels in the images in a spatial pattern so that portion of remote desktop when displayed on the local desktop of the computing device is transparent and the open cloud-application window object has the same or similar appearance as a window of a natively-operating application on the local desktop (426).

Method 400 may further include transmitting the video stream (with the video-shaped images) over the network to the personal computing device (430) and decompressing or decoding the image frames in the transmitted video stream to reconstruct the images of the remote desktop and displaying the reconstructed images of the remote desktop on the local desktop of the computing device (440). A portion of the remote desktop displayed on the local desktop of the computing device may be transparent as a result of the video shaping of the images in the video stream. Further, displaying the reconstructed images of the remote desktop on the local desktop of the computing device 440 may include displaying, on the local desktop, the open cloud-application window object corresponding to the instance of the network-hosted application executing on the network as an object having the same or similar appearance and behavior as a window of a natively-operating application on the local desktop (442) and displaying the remote desktop on the local desktop so that a portion of the local desktop is visible and user-accessible or operable through the transparent portion of remote desktop (446).

A computer system (e.g., system 100) may be deployed to practice method 400 in conjunction with a non-transitory computer-readable storage medium having instructions stored thereon. The instructions when executed by one or more microprocessors may cause the computer system to integrate a network-hosted application on to a local desktop of personal computing device as described above with reference to FIGS. 1-4.

Figure 5:
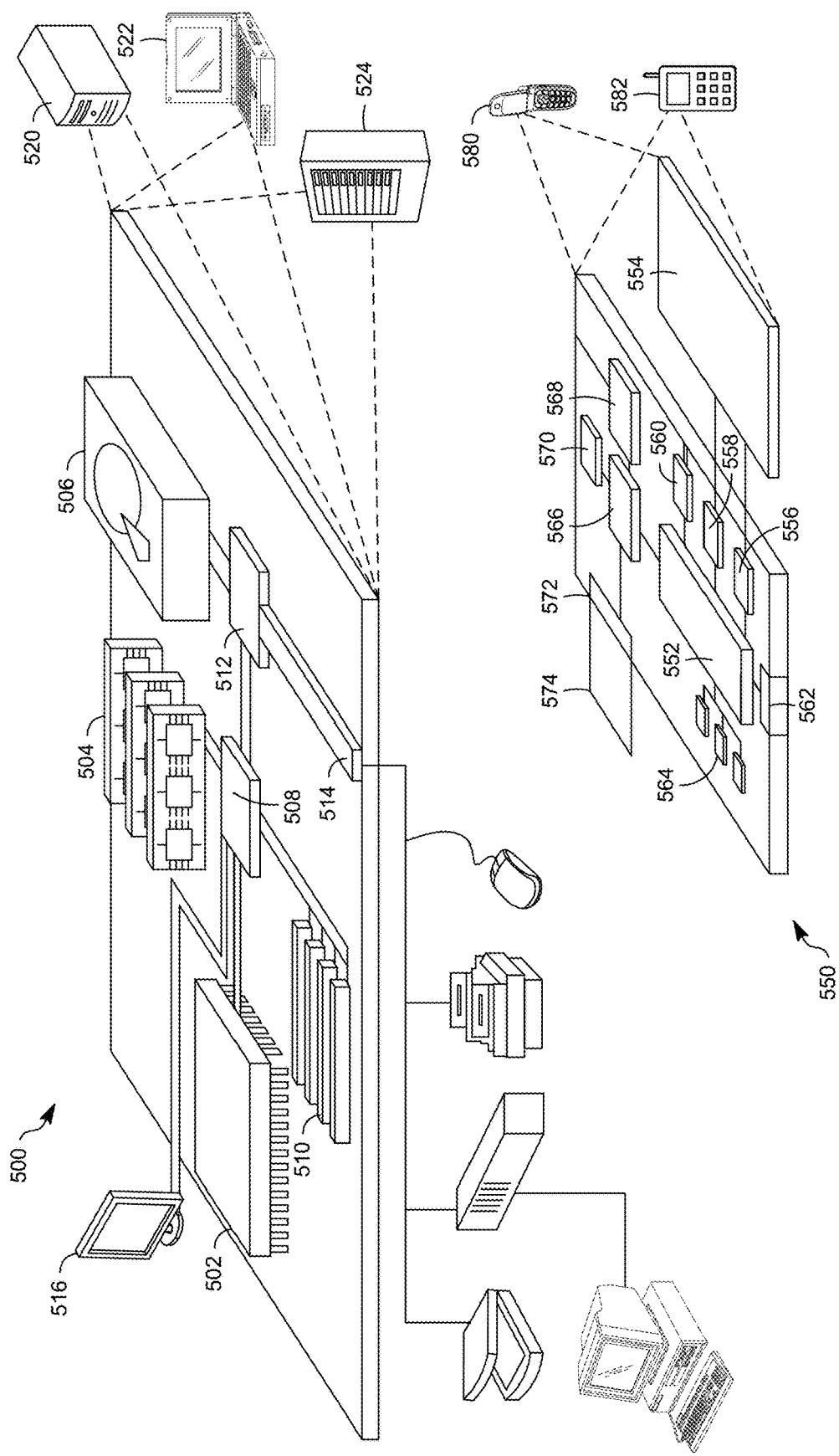
FIG. 5 is a schematic illustration of a generic computer device and a generic mobile computer device, which may be used with the techniques described herein.

FIG. 5 shows an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, and an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provided as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, Wi-Fi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the disclosure herein.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method, comprising:
receiving, on a local computing device, a video stream including a remote desktop including an open cloud-application window corresponding to a network-hosted application, the remote desktop encoded as image frames in a video stream;
decoding the image frames in the video stream of the remote desktop;
displaying the remote desktop on a local desktop of the local computing device so that:
at least a portion of a natively-operating application on the local desktop is visible through a transparent portion of the remote desktop, wherein the natively-operating application is executing natively on the local computing device, and
the open cloud-application window has an appearance of the natively-operating application;
detecting, at a location within the transparent portion of the remote desktop, a user-input action directed to the natively-operating application; and
passing the user-input action through the transparent portion of the remote desktop to the natively-operating application.

2. The method of claim 1, wherein the remote desktop includes images having a rectangular shape.

3. The method of claim 1, wherein the remote desktop encoded as image frames in the video stream include image frames shaped so that a portion of the remote desktop, when displayed on the local desktop of the local computing device, is transparent.

4. The method of claim 3, wherein the remote desktop encoded as image frames in the video stream include images encoded so that each image pixel has at least one color channel and a separate transparency channel.

5. The method of claim 4, wherein the remote desktop encoded as image frames in the video stream include images encoded so that each image pixel has a red channel, a green channel, a blue channel, and the separate transparency channel.

6. The method of claim 4, wherein the remote desktop encoded as image frames in the video stream include values assigned to alpha channels of the pixels in the images so that a portion of the remote desktop, when displayed on the local desktop of the local computing device, is transparent.

7. The method of claim 4, wherein the remote desktop encoded as image frames in the video stream include values assigned to alpha channels of the pixels in the images so that the open cloud-application window has an appearance of a window of the natively-operating application.

8. The method of claim 1, wherein the user-input action includes one or more of a keyboard entry or a mouse click.

9. The method of claim 1, wherein the remote desktop is a first remote desktop,
the method, further comprising:
displaying a second remote desktop on the local desktop of the local computing device.

10. The method of claim 1, wherein the remote desktop has dimensions smaller than dimensions of the local desktop of the local computing device.

11. The method of claim 1, wherein the passing of the user-input action includes determining at least one of a relative geometrical position or an absolute geometrical position of the user-input action.

12. A system, comprising:
at least one server including at least one processor, at least one memory, and at least one video encoder, the server hosted on a network having a communicative link for establishing a connection to a local computing device; and
a cloud computing service module coupled to the at least one video encoder, the cloud computing service module configured to:
prepare images of a remote desktop including an open cloud-application window corresponding to a network-hosted application, the images of the remote desktop having a size conforming to a size of a local desktop of the local computing device;
encode the images of the remote desktop as image frames in a video stream signal;
add a transparency channel to the video stream signal, the transparency channel carrying values of a transparency attribute of the images of the remote desktop; and
pass a user-input action through a transparent portion of the remote desktop triggered by the transparency channel to a natively-operating application on the local desktop of the local computing device when the user-input action is directed to a visible portion of the natively-operating application, wherein the natively-operating application is executing natively on the local computing device.

13. The system of claim 12, wherein the cloud computing service is configured to encode the images in the video stream so that each image pixel has at least one color channel and a separate transparency channel.

14. The system of claim 13, wherein the cloud computing service is configured to assign values to alpha channels of the pixels in the images of the remote desktop so that the transparent portion of the remote desktop, when displayed on the local desktop of the local computing device, is transparent and the open cloud-application window has an appearance of the natively-operating application.

15. The system of claim 12, wherein the cloud computing service is configured to shape the image frames in the video stream so that the portion of the remote desktop, when displayed on the local desktop of the local computing device, is transparent such that the visible portion of the natively-operating application is visible through the transparent portion of the remote desktop.

16. The system of claim 12, wherein the portion of the remote desktop that is transparent is a background portion abutting the open cloud-application window on the remote desktop.

17. A method, comprising:

receiving, at a local computing device, encoded images of a remote desktop, the remote desktop including a transparent portion and an open cloud-application window corresponding to a network-hosted application executing on a network;

decoding the received encoded images to display, on a local desktop of the local computing device, the open cloud-application window with an appearance of an open window corresponding to a natively-operating application of the local computing device;

decoding the received encoded images to display, on the local desktop, the transparent portion of the remote desktop such that a portion of the local desktop of the local computing device is visible through the transparent portion of the remote desktop;

detecting, at a location within the transparent portion of the remote desktop, a user-input action directed to a natively-operating application; and passing the user-input action through the transparent portion of the remote desktop to the natively-operating application, wherein the natively-operating application is executing natively on the local computing device.

18. The method of claim 17, wherein the images of the remote desktop have a rectangular shape and a size conforming to a size of the local desktop of the local computing device.

19. The method of claim 17, wherein the received encoded images of the remote desktop are encoded as image frames in a video stream, wherein the encoding includes video shaping the image frames in the video stream so that a portion of the remote desktop, when displayed on the local desktop, is transparent.

20. The method of claim 19, wherein the received encoded images have been encoded in the video stream so that each image pixel has at least one color channel and a separate transparency channel.

21. The method of claim 20, wherein the received encoded images have been encoded in the video stream so that each image pixel has a red color channel, a green color channel, a blue color channel, and the separate transparency channel.

22. The method of claim 20, wherein the received encoded images have been encoded by assigning values to alpha channels of the pixels in the images so that the transparent portion of the remote desktop, when displayed on the local desktop of the local computing device, is transparent.

23. The method of claim 20, wherein the received encoded images have been encoded by assigning values to alpha channels of the pixels in the images so that the open cloud-application window has an appearance of a window corresponding to a natively-operating application on the local desktop.

* * * * *